United States Patent
White

(10) Patent No.: US 8,291,634 B2
(45) Date of Patent: Oct. 23, 2012

(54) MOTION DECOY SYSTEM

(75) Inventor: Ralph M. White, Henderson, KY (US)

(73) Assignee: Ralph White, Henderson, KY (US)

(*) Notice: Subject to any disclaimer, the term of this patent is extended or adjusted under 35 U.S.C. 154(b) by 105 days.

(21) Appl. No.: 12/386,349

(22) Filed: Apr. 16, 2009

(65) Prior Publication Data

US 2011/0179691 A1 Jul. 28, 2011

Related U.S. Application Data

(60) Provisional application No. 61/045,772, filed on Apr. 17, 2008.

(51) Int. Cl.
*A01M 31/06* (2006.01)
(52) U.S. Cl. .............................................................. 43/2
(58) Field of Classification Search ................. 43/2, 3
See application file for complete search history.

(56) References Cited

U.S. PATENT DOCUMENTS

| | | | | |
|---|---|---|---|---|
| 717,790 A * | 1/1903 | Yorke | .............. | 43/3 |
| 843,588 A * | 2/1907 | Ditto | .............. | 43/3 |
| 1,468,979 A * | 9/1923 | Sherman et al. | .............. | 43/3 |
| 1,813,370 A * | 7/1931 | Villatore et al. | .............. | 43/3 |
| 2,185,013 A * | 12/1939 | Bonetti | .............. | 43/3 |
| 2,196,078 A * | 4/1940 | Pearce | .............. | 43/3 |
| 2,430,645 A * | 11/1947 | Mills et al. | .............. | 43/3 |
| 2,434,335 A * | 1/1948 | Signalness | .............. | 43/3 |
| 2,651,873 A * | 9/1953 | Risch et al. | .............. | 43/3 |
| 2,663,108 A * | 12/1953 | Dixon et al. | .............. | 43/3 |
| 3,059,368 A * | 10/1962 | Wortman | .............. | 43/3 |
| 3,927,485 A * | 12/1975 | Thorsnes, Jr. | .............. | 43/3 |
| 4,965,953 A * | 10/1990 | McKinney | .............. | 43/2 |
| 5,036,614 A * | 8/1991 | Jackson | .............. | 43/3 |
| 5,098,050 A * | 3/1992 | Bruns et al. | .............. | 43/3 |
| 5,168,649 A * | 12/1992 | Wright | .............. | 43/2 |
| 5,274,942 A * | 1/1994 | Lanius | .............. | 43/2 |
| 5,375,363 A * | 12/1994 | Higdon | .............. | 43/3 |
| 5,515,637 A * | 5/1996 | Johnson | .............. | 43/2 |
| 5,832,649 A * | 11/1998 | Kilgore | .............. | 43/2 |
| 6,079,139 A * | 6/2000 | Berry | .............. | 43/2 |
| 6,092,322 A * | 7/2000 | Samaras | .............. | 43/2 |
| 6,212,816 B1 * | 4/2001 | Babbitt et al. | .............. | 43/3 |
| 6,216,382 B1 * | 4/2001 | Lindaman | .............. | 43/2 |
| 6,487,810 B1 * | 12/2002 | Loughman | .............. | 43/2 |
| 6,519,891 B2 * | 2/2003 | Fulcher | .............. | 43/2 |
| 6,560,912 B1 * | 5/2003 | Achepohl | .............. | 43/3 |
| 6,574,902 B1 * | 6/2003 | Conger | .............. | 43/2 |
| 6,665,975 B2 * | 12/2003 | Porter | .............. | 43/3 |
| 6,708,440 B2 * | 3/2004 | Summers et al. | .............. | 43/2 |
| 6,715,228 B1 * | 4/2004 | Price | .............. | 43/3 |
| 6,775,943 B2 * | 8/2004 | Loughman | .............. | 43/2 |
| 7,076,909 B2 * | 7/2006 | Heinn et al. | .............. | 43/2 |
| 7,255,060 B2 * | 8/2007 | Grandy | .............. | 116/22 A |

(Continued)

*Primary Examiner* — Darren W Ark
(74) *Attorney, Agent, or Firm* — Krieg DeVault LLP

(57) ABSTRACT

A motion decoy system that includes a body with an interior space; a flexible portion extending from the body; a head portion partially received within the flexible neck portion and extending between a proximal and distal end. The distal end extends into the flexible portion and the interior space. A rod is attached to the body and is able to provide a pivot axis for the head portion. A counterweight is coupled to the head portion and positioned within the interior space. A cart is attached to the body where the cart includes a set of wheels for moving the decoy across the ground. A line is attached to the head of the decoy where the line is able to cause movement of the head between a rest position and a down position.

2 Claims, 6 Drawing Sheets

U.S. PATENT DOCUMENTS

| | | | |
|---|---|---|---|
| 7,493,723 B2 * | 2/2009 | Hess | 43/2 |
| 7,562,487 B2 * | 7/2009 | Barr | 43/2 |
| 2004/0194365 A1 * | 10/2004 | Summers et al. | 43/43.2 |
| 2006/0053675 A1 * | 3/2006 | Lindaman | 43/2 |
| 2006/0123688 A1 * | 6/2006 | Box et al. | 43/3 |
| 2006/0143969 A1 * | 7/2006 | Lindaman | 43/2 |
| 2010/0064569 A1 * | 3/2010 | Wyant | 43/2 |
| 2010/0175300 A1 * | 7/2010 | Lau | 43/2 |
| 2011/0113672 A1 * | 5/2011 | Holmberg | 43/2 |
| 2011/0232153 A1 * | 9/2011 | Jennings et al. | 43/2 |

* cited by examiner

MOTION DECOY SYSTEM

CROSS-REFERENCE TO RELATED APPLICATIONS

The present application claims the benefit of U.S. Provisional Application No. 61/045,772 filed 17 Apr. 2008 which is hereby incorporated by reference in its entirety.

TECHNICAL FIELD

The present invention generally relates to decoys, and more particularly, but not exclusively, to turkey decoys with motion mechanisms.

BACKGROUND

Hunters currently employ a variety of devices to lure game within firearm range. Such devices include calls, which attempt to imitate the vocal sounds uttered by the intended game; odor emitting structures, which attempt to imitate the scent of the intended game or a specific gender of the intended game; and decoys, which attempt to imitate the appearance of the game in its natural habitat. The present invention falls within the last category. Some existing decoy systems have various shortcomings relative to certain applications. Accordingly, there remains a need for further contributions in this area of technology.

SUMMARY

One embodiment of the present invention is a unique motion decoy system. Other embodiments include apparatuses, systems, devices, hardware, methods, and combinations for a turkey decoy. Further embodiments, forms, features, aspects, benefits, and advantages of the present application shall become apparent from the description and figures provided herewith.

DETAILED DESCRIPTION OF REPRESENTATIVE EMBODIMENTS

Figure 1:
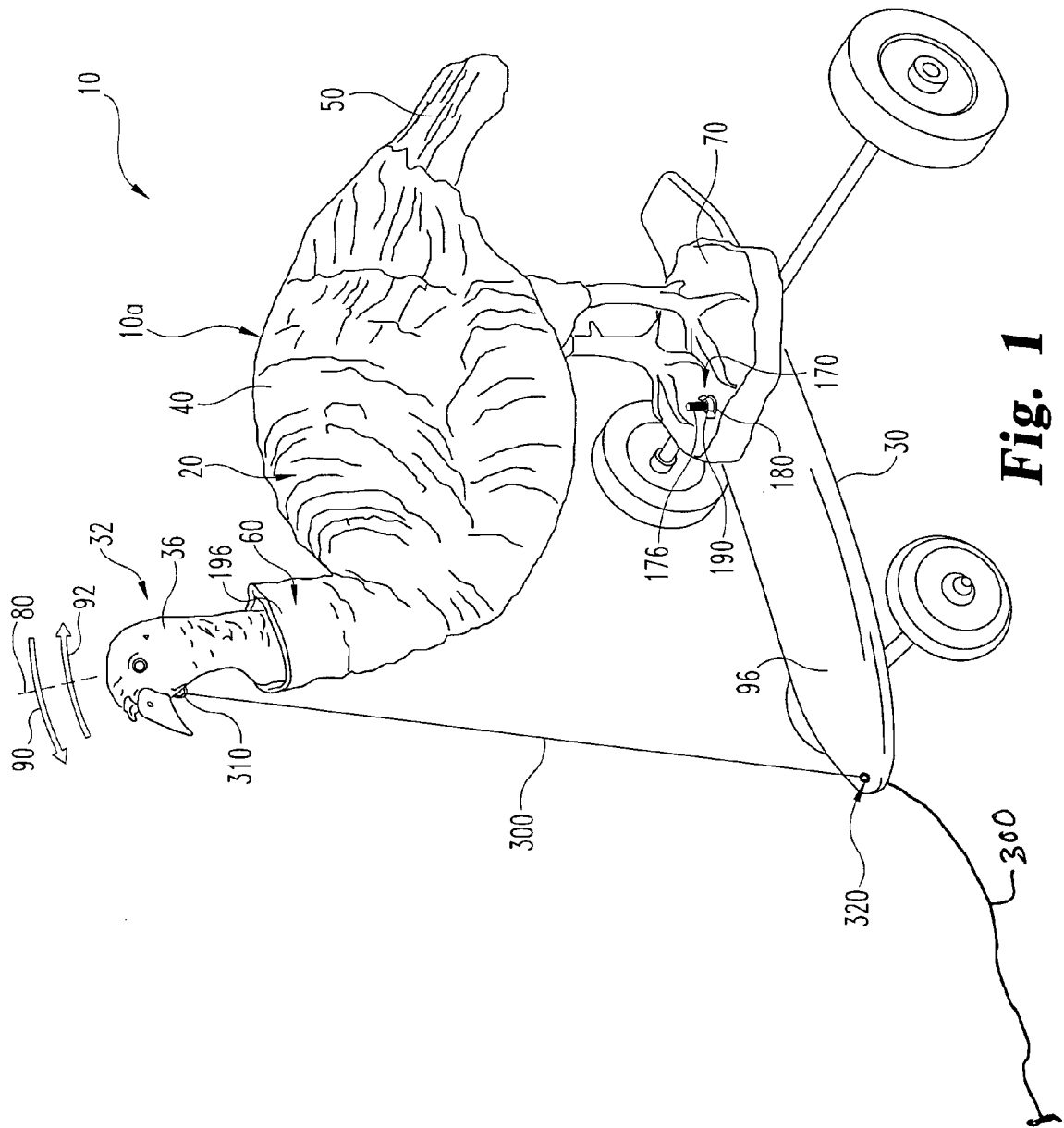
FIG. 1 is a side perspective view of a motion decoy system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 3:
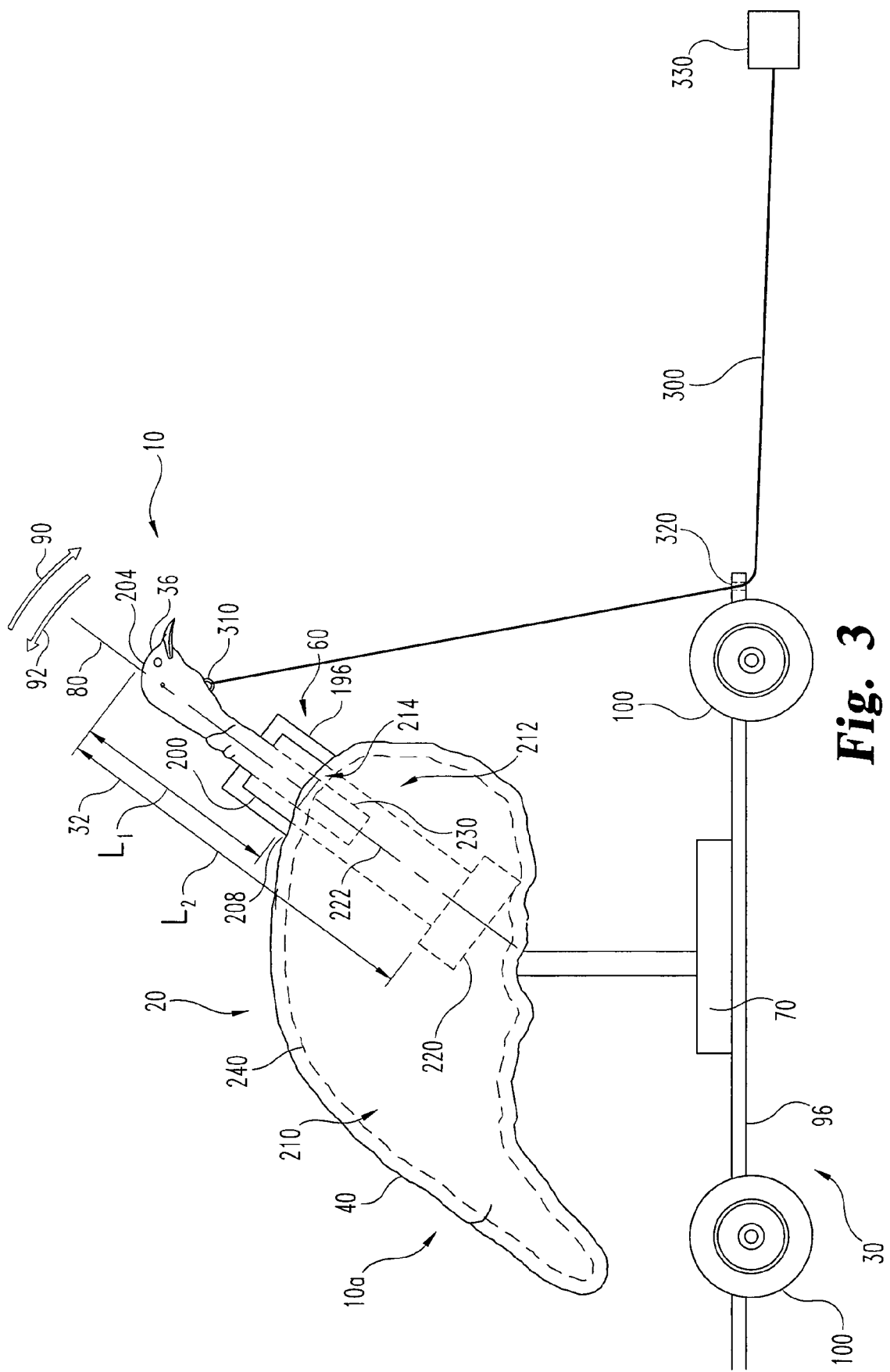
FIG. 3 is a partial, diagrammatic side view of the system of FIG. 1.

FIG. 1 illustrates a motion decoy system 10 that includes an animal decoy 10a that simulates the appearance of a particular type of animal. Decoy 10a is typically used to attract animals of the same species it is made to simulate. In one embodiment as depicted, decoy 10a includes a body 20, in the form of a turkey hen having a head assembly 32, mounted to a mobile platform 30 in the form of a wheeled cart. Body 20 of decoy 10a further includes a main body portion 40, a tail portion 50, and a base 70. As discussed in further detail below with reference to FIG. 3, head assembly 32 includes a head portion 36 and a neck portion 60. One form of the present application contemplates main body portion 40, tail portion 50, base 70, and head portion 36 being formed from a substantially rigid hollow material. In one example, main body portion 40, tail portion 50, base 70, and head portion 36 are formed from plastic shaped and colored to simulate a wild turkey. As shown in FIGS. 1 and 3, head portion 36 extends into neck portion 60 and is configured and operable for movement with neck portion 60 from a rest position defining a rest axis 80 in both a forward direction 90 and a backward direction 92. In one form of the present application, movement in directions 90, 92 occurs substantially or completely in a single plane and simulates a head bobbing motion. Other forms of the present application contemplate movement in multiple planes.

Figure 2:
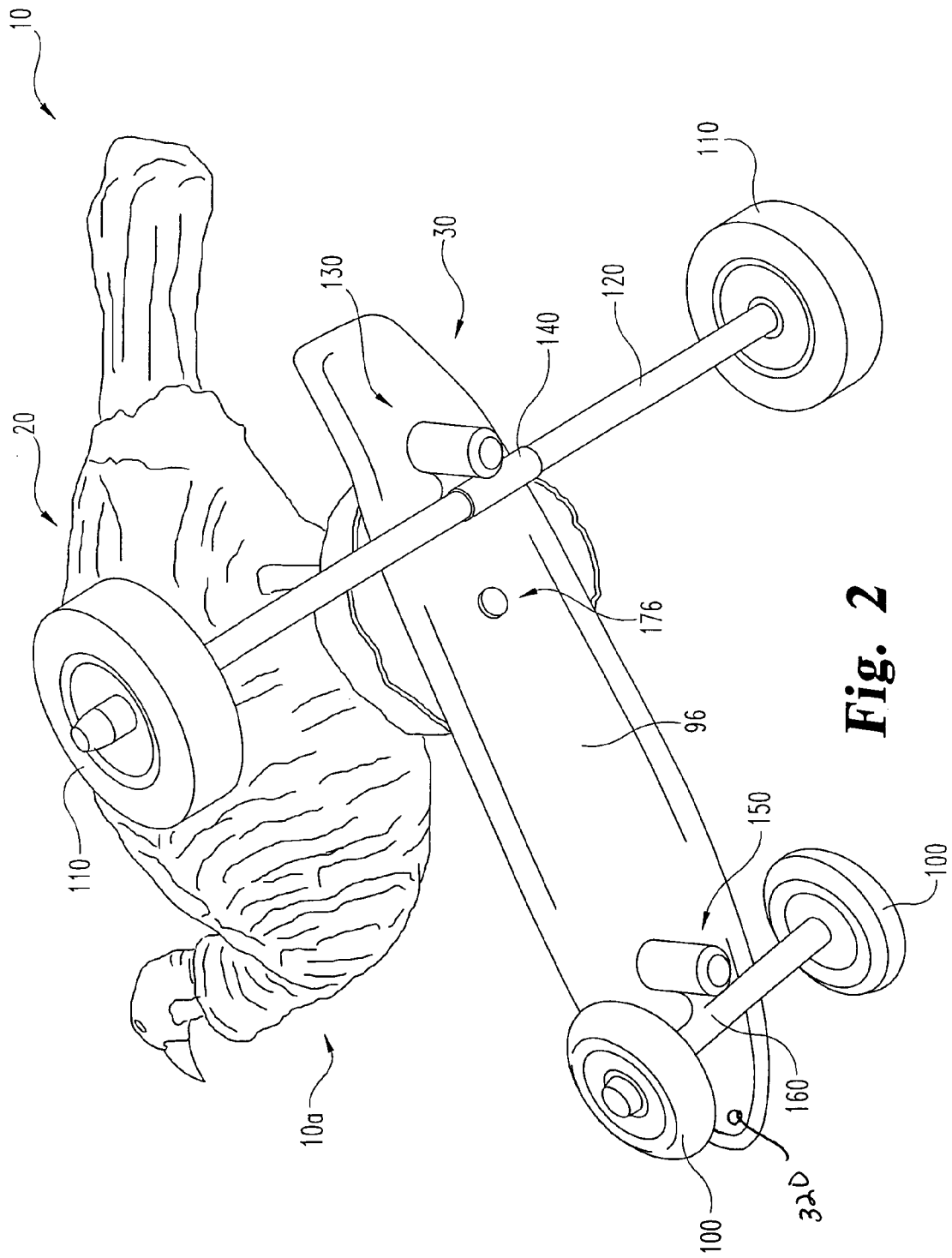
FIG. 2 is a bottom perspective view of the system of FIG. 1.

Referring now to FIGS. 1 and 2, platform 30 includes a platform base 96 supported above the ground (FIG. 1) by front wheels 100 and rear wheels 110. Rear wheels 110 are coupled to a rear axle 120 of a rear wheel attachment assembly 130. Rear wheel attachment assembly 130 includes a rear axle sleeve 140 which is coupled to platform base 96. Front wheels 100 are coupled to a front axle (not shown) of a front wheel attachment assembly 150. Front wheel attachment assembly 150 includes a front axle sleeve 160 which is coupled to platform base 96. As also shown in FIG. 2, rear wheels 110 are sized with a larger diameter compared to front wheels 100 and rear axle 120 is sized to include a length longer than the front axle to aid in preventing mobile animal decoy 10 from tipping over as it is moved along the ground. Other forms of the present application contemplate front wheels 100 being sized the same as or larger than rear wheels 110. It is further contemplated that the rear axle 120 could have a length equal to a length of the front axle or a length smaller than a length of the front axle.

As shown in FIGS. 1 and 2, base 70 is coupled to platform 30 with a coupling assembly 170. Coupling assembly 170 includes two bolts 176. Each bolt 176 extends upwards through an opening (not shown) defined in base 70 and an opening (not shown) in platform 30 and bolt 176 receives a corresponding washer 180 and nut 190 to couple decoy 10a to platform 30. Other forms of the present application contemplate coupling decoy 10a to platform 30 in a number of different ways including but not limited to the use of multiple coupling assemblies and through the use of an adhesive. Additionally, it is further contemplated and within the scope of the present application that at least a portion of decoy 10a could be integrally formed with platform 30.

Figure 4:
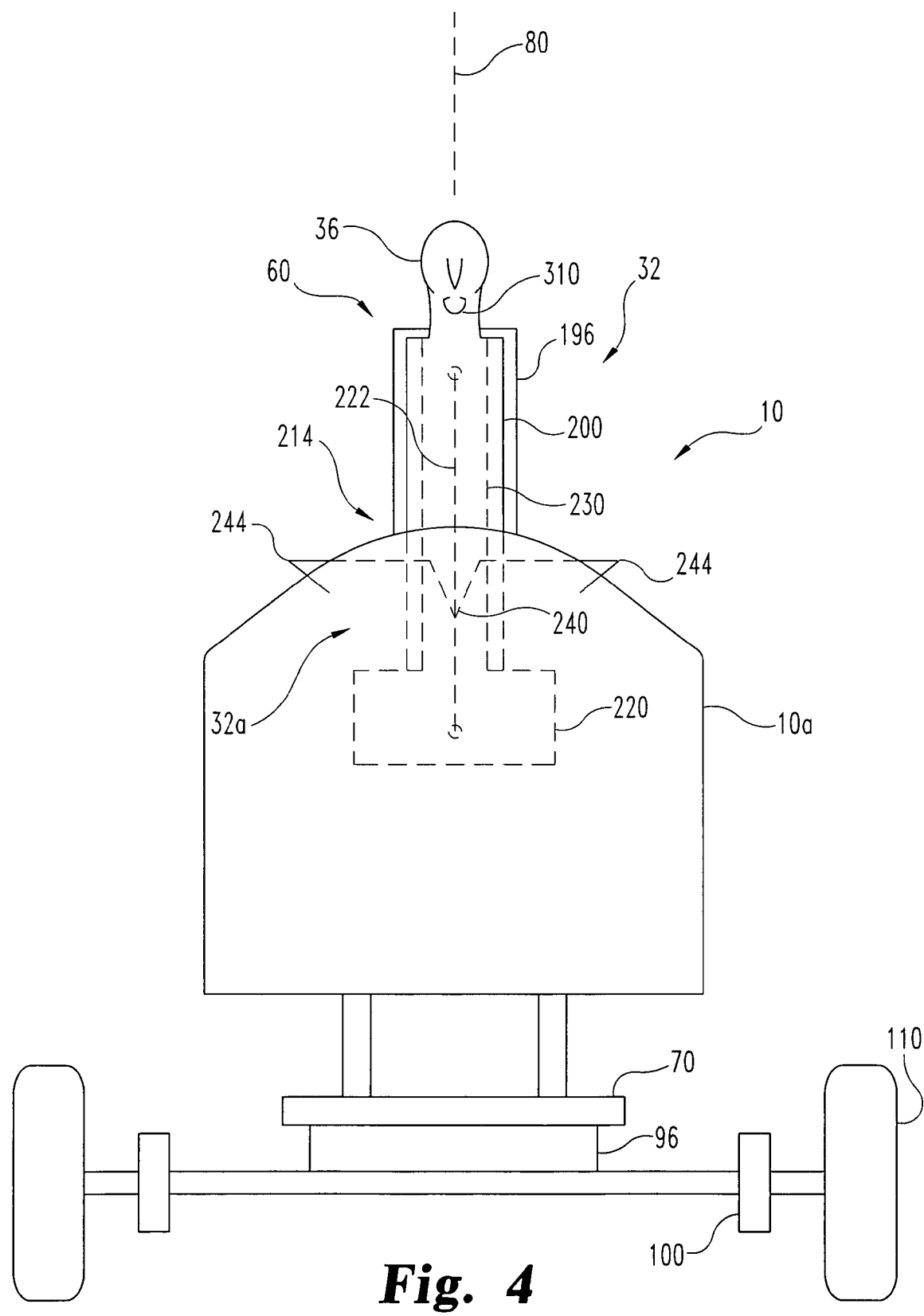
FIG. 4 is a partial, diagrammatic front view the system of FIG. 1.

As shown in FIGS. 1, 3, and 4, neck portion 60 includes a cover 196 and a flexible member 200 coupled to head portion 36. In one form of the present application, cover 196 is formed from a cloth or similar material, and flexible member 200 is formed from a flexible material such as rubber.

As shown in FIG. 3, head portion 36 extends a length $L_1$ between a proximal end 204 and a distal end 208 and is received within an interior 210 of main body portion 40. Head portion 36 is coupled to flexible member 200 to form a moveable head 212. Moveable head 212 has a length $L_2$ and extends through a body opening 214 formed in main body portion 40. In one form length $L_2$ is about 11.5 inches to about 12 inches.

Referring now to FIGS. 3 and 4, it is contemplated that head assembly 32 further includes a counterweight 220 and a pivot rod 230 (collectively also designated as a form of decoy movement mechanism 32*a*). Counterweight 220 is coupled to head portion 36 with a resilient member 222 of mechanism 32*a*. In one form of the present application, resilient member 222 is in the form of a stretched coil spring. Additionally, it is further contemplated that flexible member 200 could also be coupled to counterweight 220. Counterweight 220 is sized to bias moveable head 212 towards the rest position and in one form is between about 6-8 times heavier than head portion 36.

To allow for rotation or movement of moveable head 212, pivot rod 230 extends through openings (not shown) in each of head portion 36, flexible member 200, and main body portion 40. To retain moveable head 212 in a substantially centered position relative to body opening 214, pivot rod 230 includes a v-shaped portion 240 to prevent or minimize lateral movement along pivot rod 230 of moveable head 212. Pivot rod 230 is attached to main body portion 40 by crimping ends 244 of pivot rod 230 to provide the pivot point for movement in directions 90 and 92. In one form of the present application, pivot rod 230 is located to allow a full range of motion of moveable head 212 and counterweight 220 while also preventing counterweight 220 from colliding with main interior surface 240 of body portion 40.

To allow for control of system 10 by a user, system 10 further includes a line 300 coupled to an attachment portion 310 of head portion 36. Line 300 extends from attachment portion 310 and passes through an opening 320 defined in platform base 96 to a spool 330 which a user would use to actuate movement. In one form of the present application, line 300 extends at least 50 yards. In other embodiments line may be shorter or longer. It should be appreciated that line 300 is not shown in FIGS. 2 and 4 to preserve clarity.

In operation, a location is first selected for decoy 10*a*. Decoy 10*a* is then placed at such location to attract animals. A user can remotely move decoy 10*a* across the ground from a different location, (such as a concealed decoy operating site) by pulling line 300 toward the user. When enough force is generated by the user to pull decoy 10, moveable head 212 moves in direction 90 towards the down position. Corresponding motion of flexible member 200 also occurs until it is prevented from further movement by an edge of body opening 214. Typically, even after flexible member 200 stops moving, head portion 36 continues moving forward in direction 90 until head portion 36 also is stopped by the edge of body opening 214. With the head portion 36 facing the ground, the pulling motion continues and moves decoy 10 across the ground. When movement stops and tension in line 300 is released, counterweight 220 biases moveable head 212 back to the rest position. To create a bobbing motion of head portion 36, which has been found to be enticing to male turkeys, the user pulls and releases line 300 while not necessarily applying force sufficient to move platform 30. Indeed, system 10 provides for a wide array of different combinations of platform 30 movements (including the entire decoy 10*a*) and movements of one part of decoy 10*a* (such as the head) relative to another decoy part (such as the decoy body). In one alternative embodiment, decoy 10*a* is used with line 300 to provide this form of remote head motion control, but utilizes a stationary rather than mobile platform. In still other embodiments, a different line and/or motion-imparting technique may be used to move mobile platform 30 in addition to the line used to move the head. As used herein, a "line" broadly includes, without limitation, any type of cable, rope, hawser, string, tendon, ligature, strap, tie, belt, braid, wire, chain, cord, strand, filament, or fiber. In yet other embodiments, a different movement linkage is used, such as a push rod or the like. Further embodiments of the present application contemplate other ways to remotely move head portion 36, such as through the use of at least one spring coupled between neck portion 60 and head portion 36, and/or with different types of mechanisms. Alternatively or additionally, other embodiments provide for movement of one or more other parts of the decoy 10*a*.

Figure 5:
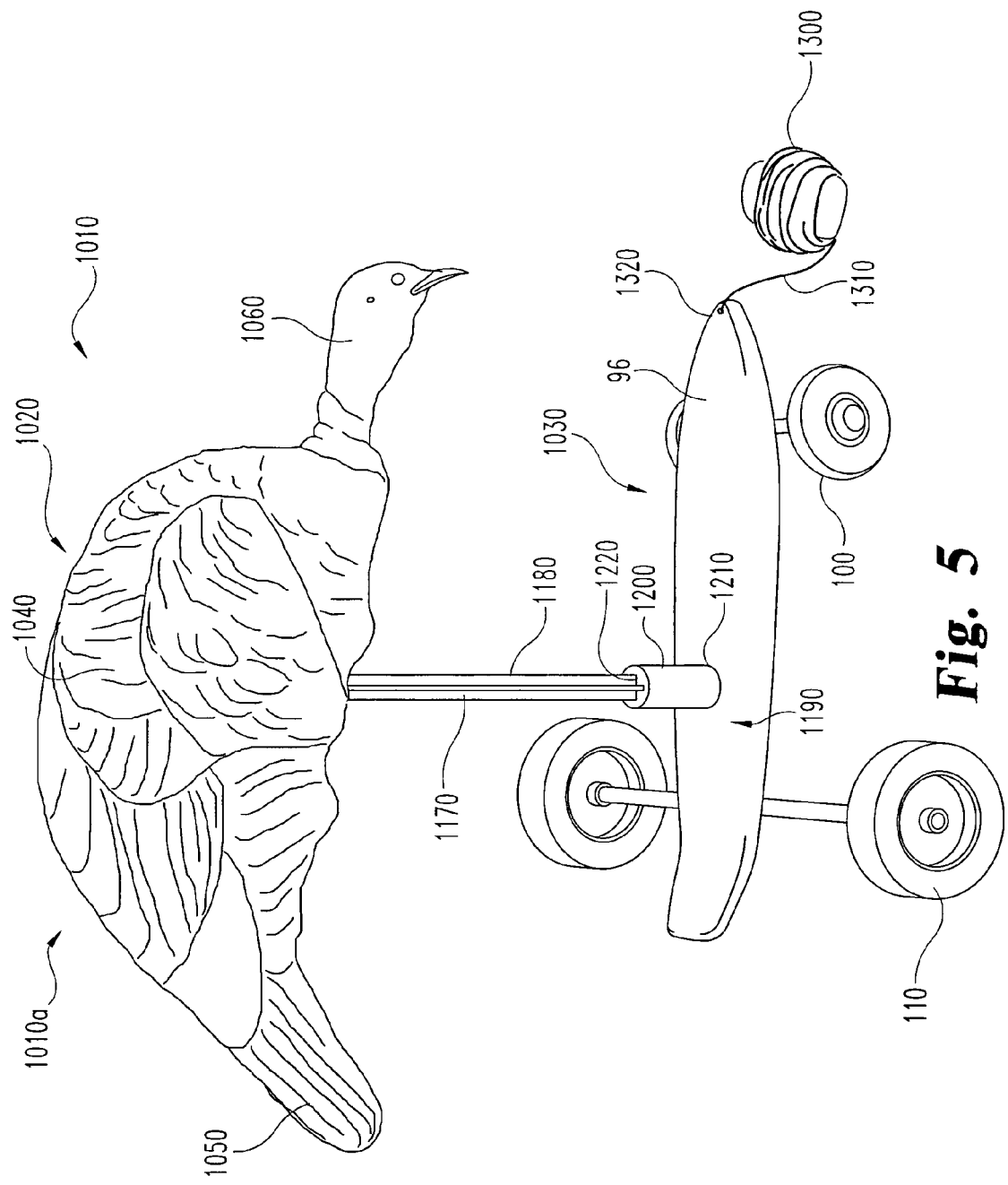
FIG. 5 is a side perspective view of another motion decoy system.
Figure 6:
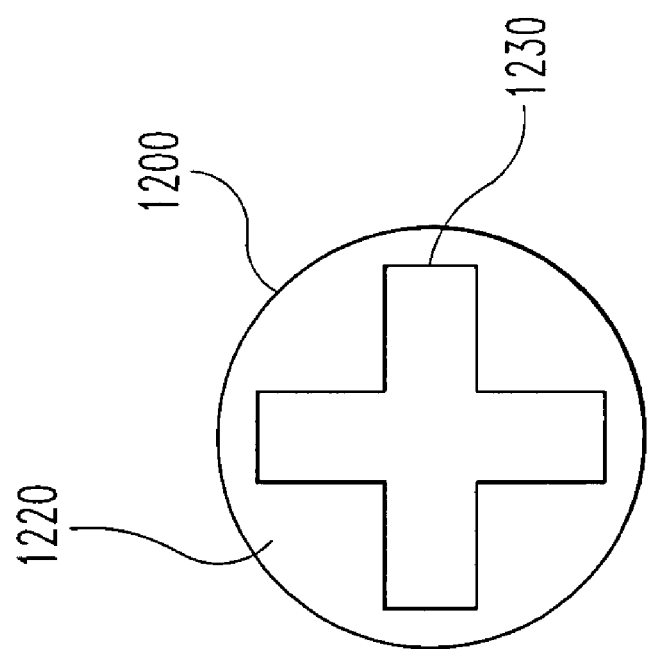
FIG. 6 is a top view of a receiving base of the system of FIG. 5.

Referring now to FIG. 5, there is illustrated another embodiment of a decoy system 1010; where like reference numerals refer to like features previously described. System 1010 includes decoy 1010*a*. Decoy 1010*a* includes a body 1020 in the form of a turkey mounted to platform 1030. Body 1020 includes a main body 1040, a tail portion 1050, and a head portion 1060. One form of the present application contemplates that head portion 1060 is stationary relative to main body 1040. Body 1020 is coupled to platform 30 with a coupling assembly 1170. Coupling assembly 1170 includes a rod 1180 and a receiving base 1190 coupled to platform 1030. As shown in FIG. 5, rod 1180 extends from body 1020 and is received within receiving base 1190. In one form of the present application, rod 1180 is removably coupled to each of body 1020 and receiving base 1190 and is retained in place by friction. Other forms of the present application contemplate rod 1180 being permanently attached or integrally formed with body 1020. As shown in FIGS. 5 and 6, receiving base 1190 includes a body member 1200 extending between a cart end 1210 and a rod end 1220. Referring now to FIG. 6, a cross-shaped slot 1230 is defined in body member 1200 and extends from rod end 1220 towards cart end 1210. Slot 1230 is sized and configured to receive a complementary shaped portion (not shown) of rod 1180 to couple body 1020 to platform 30. In one form of the present application, slot 1230 extends the entire length of body member 1200. Other forms contemplate slot 1230 extending less than the entire length of body member 1200. The present application further contemplates that receiving base 1190 is coupled to platform 30 in a variety of different ways such as a bolt (not shown) extending from and/or through platform base 96 and engaging a threaded portion (not shown) defined in cart end 1210. Other forms of the present application contemplate coupling body 1020 to platform 30 in a number of different ways including but not limited to the use of multiple bolts and through the use of an adhesive. Additionally, it is further contemplated within the scope of the present application that at least one of the components of system 1010 including at least a portion of body 1020, rod 1180, and receiving base 1190 could be integrally formed with platform 30.

As shown in FIG. 5, line 1300 is coupled to opening 1320 in platform base 96. Line 1310 extends to spool 1300 held by the user. The spool 1300 is provided to allow line 1310 to be wound thereto to aid in preventing line 1310 from being tangled. In operation, the user moves platform 1030 across the ground by pulling line 1310 toward spool 1300 to simulate movement of the animal decoy.

Figure 7:
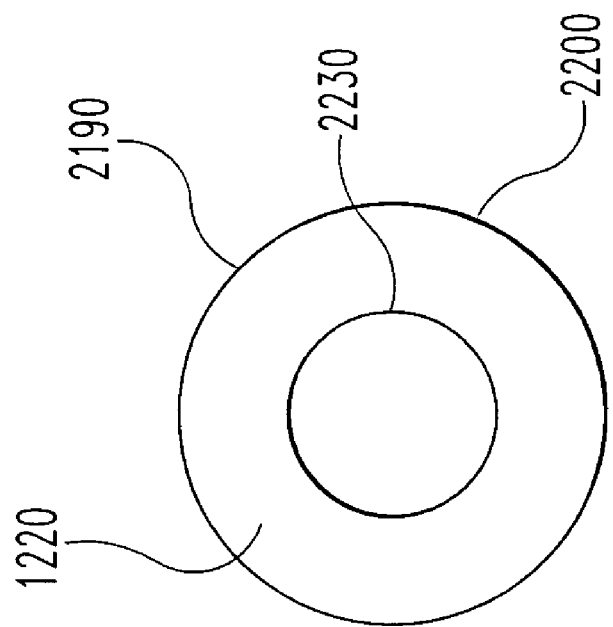
FIG. 7 is a top view of another type of receiving base.

Referring now to FIG. 7, there is illustrated another embodiment of a receiving base 2190 which is similar to receiving base 1190 and where like features are designated with like reference numerals. Receiving base 2190 includes a body member 2200 extending between a cart end 1210 (not shown in FIG. 7) and a rod end 1220. A circular-shaped slot 2230 is defined in body member 2200 and extends from rod end 1220 towards cart end 1210. Slot 2230 is sized and shaped to receive a complementary shaped portion (not shown) of a rod (not shown) of an animal decoy body (not shown) to platform 30. In one form of the present application, slot 2230 extends the entire length of body member 2200. Other forms contemplate slot 2230 extending less than the entire length of body member 2200. The present application further contemplates that the receiving base 2190 and the rod (not shown) with the complementary shaped portion would operate much the same way as receiving base 1190 and rod 1180

Many further embodiments of the present application are envisioned. For example, in one form, the decoy includes a decoy body with an interior space; a flexible decoy neck extending from the decoy body; and a decoy head mechanism that pivots in relation to the decoy body. The decoy head mechanism includes a decoy head opposite a counterweight. The decoy head extends from the flexible decoy neck and the counterweight which is positioned in the interior space of the decoy body. The decoy further may include a line attached to the decoy head mechanism to remotely move the decoy head back and forth by pulling on the line. The counterweight returns the decoy head to the at-rest position when the tension on the line is released. The decoy may further include a mechanism which includes at least one coil spring. In one specific form, the decoy is in the form of a turkey. The decoy may further include a mobile platform to carry the decoy and a means for pulling the platform along a path to move the decoy.

In another form, the present invention discloses a method which comprises the following steps: (1) selecting a location for an animal decoy; (2) placing the animal decoy at the selected decoy location where, in one form, the decoy can be carried on a mobile platform; (3) selecting a decoy operating site spaced apart from the decoy location; and (4) from the decoy operating site, causing motion (such as flexing) of a portion of the decoy (such as the head extending from a flexible neck) relative to the body of the decoy while the decoy is at the selected decoy location. In yet another form, the motion is caused by pulling on a line attached to a portion of the decoy from the decoy operating site. In still another form, the motion can be cause, from the decoy operating site, by pulling a line attached to the mobile platform to move the decoy to a second location different than the first selected decoy location or the decoy operating site.

In one other form, the motion can be caused by flexing the portion of the decoy being moved; where the portion of the decoy includes a decoy head and the motion is caused by pulling on a line attached to the portion of the decoy from the decoy operating site; the decoy is carried on a mobile platform; and, from the operating site, a line attached to the mobile platform is pulled to move the decoy to a second location different than the first selected location or the decoy operating site.

A mobile turkey decoy includes a body with an interior space; a flexible portion extending from the body; a head portion partially received within the flexible neck portion and extending between a proximal and distal end. The distal end extends into the flexible portion and the interior space. A rod is attached to the body and is able to provide a pivot axis for the head portion. In one form, a counterweight is coupled to the head portion and positioned within the interior space. A cart is attached to the body where the cart includes a set of wheels for moving the decoy across the ground. A line is attached to the head of the decoy where the line is able to cause movement of the head between a rest position and a down position.

In yet another form, the apparatus comprises a decoy which includes a decoy body with an interior space and a decoy movement mechanism pivoting inside the decoy body. The decoy movement mechanism includes a decoy portion opposite a counterweight. The decoy portion extends from the decoy body and the counterweight which is positioned in the interior space of the decoy body. A line is attached to the decoy mechanism to move the decoy portion remotely.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by any claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A mobile turkey decoy comprising:
   a body defining an interior space;
   a flexible portion extending from the body;
   a head portion partially received within the flexible portion and extending between a proximal and distal end of the head portion, the distal end extending into the flexible portion and the interior space;
   a rod coupled to the body and being operable to provide a pivot axis for the head portion;
   a counterweight coupled to the head portion and positioned within the interior space;
   a cart coupled to the body, the cart including a plurality of wheels operable for movement across the ground; and
   a single line coupled to the head portion through an opening in a forward portion of the cart;
   wherein the single line is operable to cause movement of the head portion between a rest position and a down position and forward movement of the cart from a first location to a second location.

2. The mobile decoy turkey of claim 1, wherein the single line is operable to provide the movement of the head portion and the forward movement of the cart with a single operation.

* * * * *